United States Patent
Pfeiffer et al.

(10) Patent No.: US 6,888,154 B2
(45) Date of Patent: May 3, 2005

(54) METHOD OF MARKING AND DETECTING DISC INDEX

(75) Inventors: Michael William Pfeiffer, Savage, MN (US); James John Stirn, Savage, MN (US); Richard Gordon Goodrich, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/091,803

(22) Filed: Mar. 6, 2002

(65) Prior Publication Data

US 2003/0075695 A1 Apr. 24, 2003

Related U.S. Application Data

(60) Provisional application No. 60/337,474, filed on Oct. 18, 2001.

(51) Int. Cl.[7] ............................. G01N 21/86; G01V 8/00
(52) U.S. Cl. ..................................... 250/559.4; 356/400
(58) Field of Search ........................ 250/559.4, 559.44, 250/559.22, 559.29, 548; 356/400, 244, 602; 360/75, 48, 57, 77.08, 77.03, 98.08; 369/13.34, 44.14

(56) References Cited

U.S. PATENT DOCUMENTS

| | | | |
|---|---|---|---|
| 4,639,604 A | | 1/1987 | Murakami et al. |
| 5,684,599 A | | 11/1997 | Shimoyama et al. |
| 5,986,753 A | | 11/1999 | Seelig et al. |
| 6,009,063 A | * | 12/1999 | Nguyen et al. .......... 369/13.34 |
| 6,041,703 A | * | 3/2000 | Salisbury et al. ............. 101/37 |
| 6,091,564 A | * | 7/2000 | Codilian et al. .............. 360/75 |
| 6,109,324 A | | 8/2000 | Bugner et al. |
| 6,208,480 B1 | * | 3/2001 | Tigner ........................ 360/63 |
| 6,342,705 B1 | | 1/2002 | Li et al. |
| 2002/0181150 A1 | * | 12/2002 | Buske et al. ............. 360/98.08 |

* cited by examiner

*Primary Examiner*—Thanh X. Luu
*Assistant Examiner*—Seung C. Sohn
(74) *Attorney, Agent, or Firm*—Fellers, Snider, et al.

(57) ABSTRACT

The present invention allows placement of a disc at an angular orientation by marking the disc with an index mark or feature that can be detected, such as by a disc stacking machine used in a servo track writer. Either index is used to rotate the disc to the angular position. The present invention includes marking a disc surface with a mark or feature. An apparatus, such a stacking machine, will read the mark or feature to orient the disc in an angular position. The stacking machine will stack the positioned discs for servo track writing.

13 Claims, 6 Drawing Sheets

METHOD OF MARKING AND DETECTING DISC INDEX

RELATED APPLICATIONS

This application claims priority to U.S. Provisional Application No. 60/337,474 filed Oct. 18, 2001, entitled "METHOD OF MARKING AND DETECTING DISC INDEX."

FIELD OF THE INVENTION

This invention relates generally to the field of data storage, and more particularly, but not by way of limitation, to provide disc alignment.

BACKGROUND

Disc drives are used for data storage in modern electronic products ranging from digital cameras to computers and network systems. Typically, a disc drive includes at least one disc with a recording surface rotated at a constant speed by a spindle motor assembly and an actuator assembly positionably controlled by a servo system. The actuator assembly supports a read/write head that writes data to and reads data from the recording surface.

One type of data recorded to and read from the information tracks is servo data. Servo data includes a physical track identification portion (also referred to as a servo track number or physical track number) written to the recording surface to define each specific physical track of a number of physical tracks written on the recording surface, and servo bursts that indicate fine position within a physical track. Servo data is recorded on the recording surface at servo sector locations. A servo track writer is traditionally used in writing a predetermined number of servo sectors to each recording surface during the manufacturing process. As explained above, the data in the servo sectors are used by the servo system for controlling the position of the read/write head relative to the recording surface during disc drive operations.

Typically, servo track writing is done after the disc drive is assembled. Once assembled, the servo track writer uses the disc drive read/write heads to record the servo track data. A recent disc drive servo track writing technology known as Multi-Disc Writing (MDW) writes at least two discs at a time that are then assembled in the disc drive.

SUMMARY OF THE INVENTION

The present invention allows placement of at least one disc at an angular orientation by marking the disc with an index mark or feature that can be detected, such as for placement in a servo track writer or in a disc drive. Either index is used to rotate the disc to the angular position. To that end, the present invention includes marking a disc surface with at least one index mark or feature. The index mark should be distinguishable from other non-index marks on the disc. An apparatus will read the mark or feature to orient or align the disc in an angular position. If desired, the oriented or aligned disc can be stacked for servo track writing or assembly into a disc drive.

The present invention further includes an apparatus that detects the index mark or feature. The apparatus includes a motor that rotates a disc, a sensor to detect an index mark on the disc and a controller to interact with the motor and the sensor. The sensor is preferably optical, but can also include a camera or a mechanism. Such an apparatus can be used to align a disc before information is written to the disc and before the disc is placed in a disc drive.

These and various other features and advantages, which characterize the present invention, will be apparent from a reading of the following detailed description and a review of the associated drawings.

DETAILED DESCRIPTION

Figure 1:
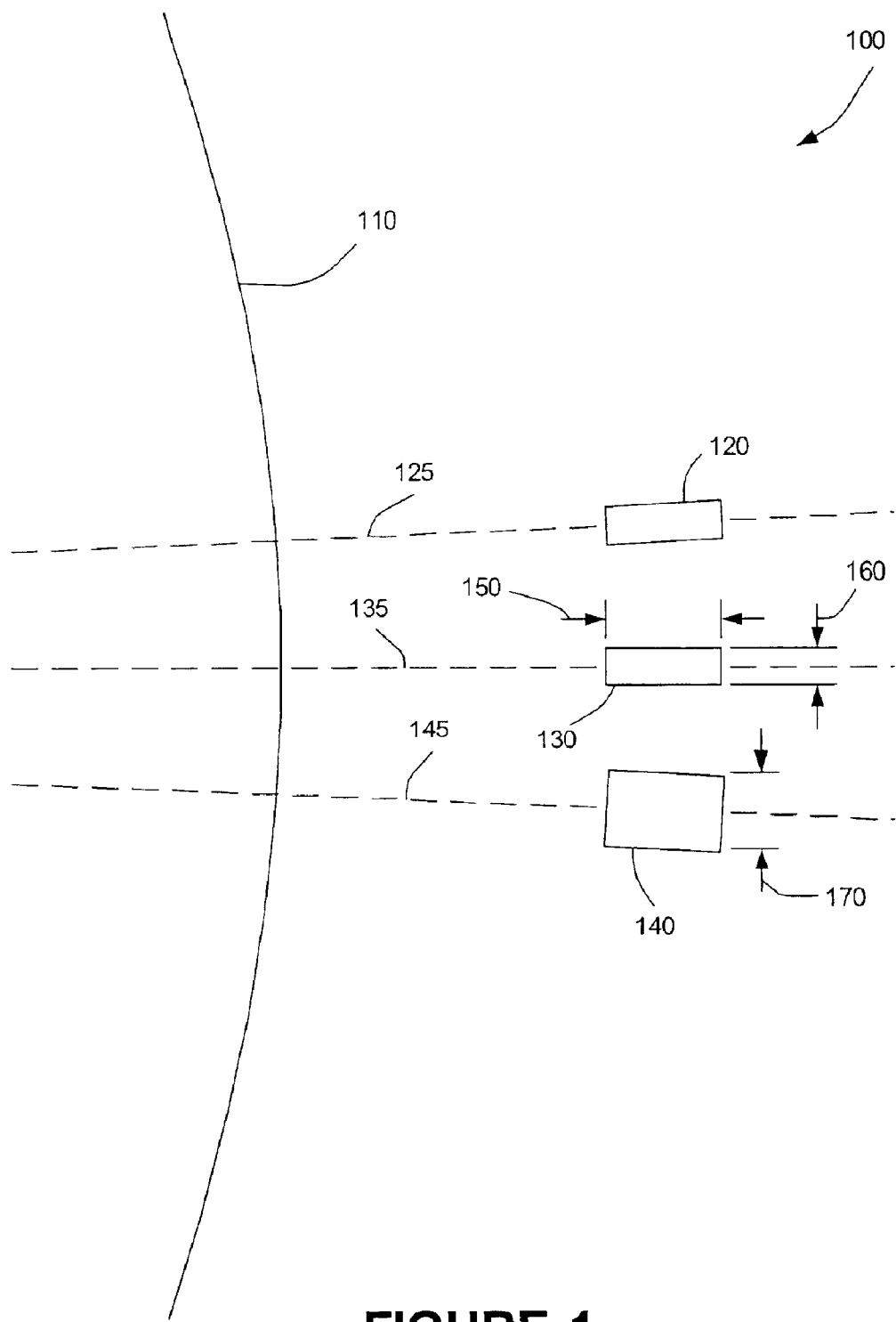
FIG. 1 shows a storage device that has a reference marking or feature according to the present invention.

While this invention is susceptible of embodiment in many different forms, there is shown in the drawings and will be described herein in detail specific embodiments thereof with the understanding that the present disclosure is to be considered as an exemplification of the principles of the invention and is not to be limited to the specific embodiments described.

Figure 4:
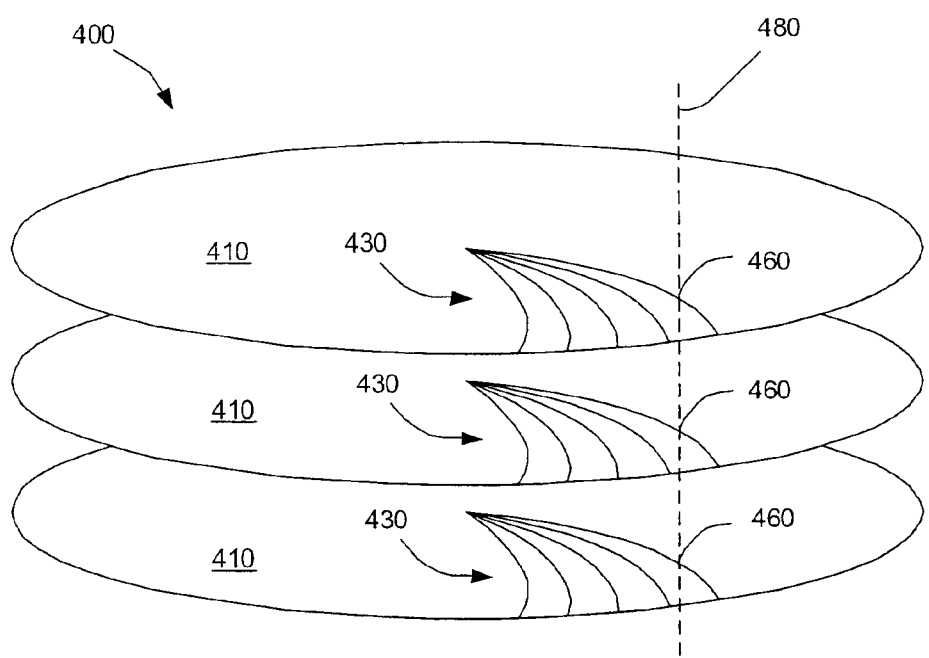
FIG. 4 shows an array of discs having associated servo sectors.

The present invention can be advantageously used with MDW. MDW should have the discs placed on the motor hub of the servo track writing apparatus in a precise angular orientation to maintain servo track concentricity after the discs are placed in the disc drive. To illustrate, FIG. 4 shows a stacked array 400 that includes discs 410. Each of discs 410 includes servo wedges 430. A servo wedge includes servo sectors that identify, among other things, track numbers and angular location. Maintaining the servo sectors substantially aligned (generally shown by dashed line 480) is desired in part because of the manner in which data can be stored in array 400. As background, when a complete track of information is written and there is still more information to be written, instead of moving the write head to another track on the same disc 410, a different write head continues to write data on the same track, but on a different disc 410. This saves time compared to jumping a track on the same disc. To further save time, maintaining the substantially same angular location identifiers among discs 410 is also desired. For example, servo sectors 460 each identify a specific track number and angular location. To have one or more of servo sectors 460 shifted relative to line 480 means that when the reading or writing of array 400 moves between discs 410, extra time will be used to locate servo sector 460. However, as explained with reference to FIG. 5, an offset of servo sector 460 may be desired.

FIG. 1 shows a disc portion 100 of a disc. Disc portion 100 includes an arc 110 that is a portion of a circumference associated with the disc. This circumference can be defined, for example, by the center opening or inner diameter of the disc. Alternatively, the circumference can be defined by an area, zone or region of the disc, including the outer diameter. Such an area, zone or region can be a laser texture zone, a clamp or a spacer area, a landing zone, an information track, etc. In addition, arc 110 can be a portion of a spiral, such as is common on some optical discs. Also, the present invention encompasses discs having different geometries or dimensions.

In a proximity of arc 110 are index marks (or features) 120, 130 and 140 that are disposed along radii 125, 135 and 145, respectively. The angular displacements between radii pair 125, 135 and 135, 145 are preferably both 6°. However, the angular displacement can be within any range. Also, the angular displacements can be unequal. Index marks 120 and 130 are shown having preferred equivalent dimensions of 0.040" in the radial dimension 150 and 0.020" in the tangential dimension 160. Marking 140 preferably has the same radial dimension as index marks 120 and 130, and has a tangential dimension 170 of 0.040'. The dimensions of these index marks are preferably as large as possible. However, the space available on the disc may dictate the dimensions of the index marks.

Index marks 120, 130 and 140 are preferably made by a laser texture process using a standard disc laser texturing machine, but other processes can be used like chemical etching. Also, the disc can be colored or a material can be disposed (removably or permanently) on the disc to create one or all the markings. One preferred characteristic of the markings is that they are distinguishable from other features of the disc, such as the zones, area or regions described above, as well as dust, scratches or other surface imperfections, contaminants or blemishes. Preferably, at least two of the index marks 120, 130, 140 are distinguishable among themselves. In addition, the placement of the various-sized index marks can be used as an identifier. To illustrate, the pattern shown in FIG. 1 can identify a top side of the disc, whereas a pattern that is reversed from that shown can identify a bottom side of the disc.

Figure 2:
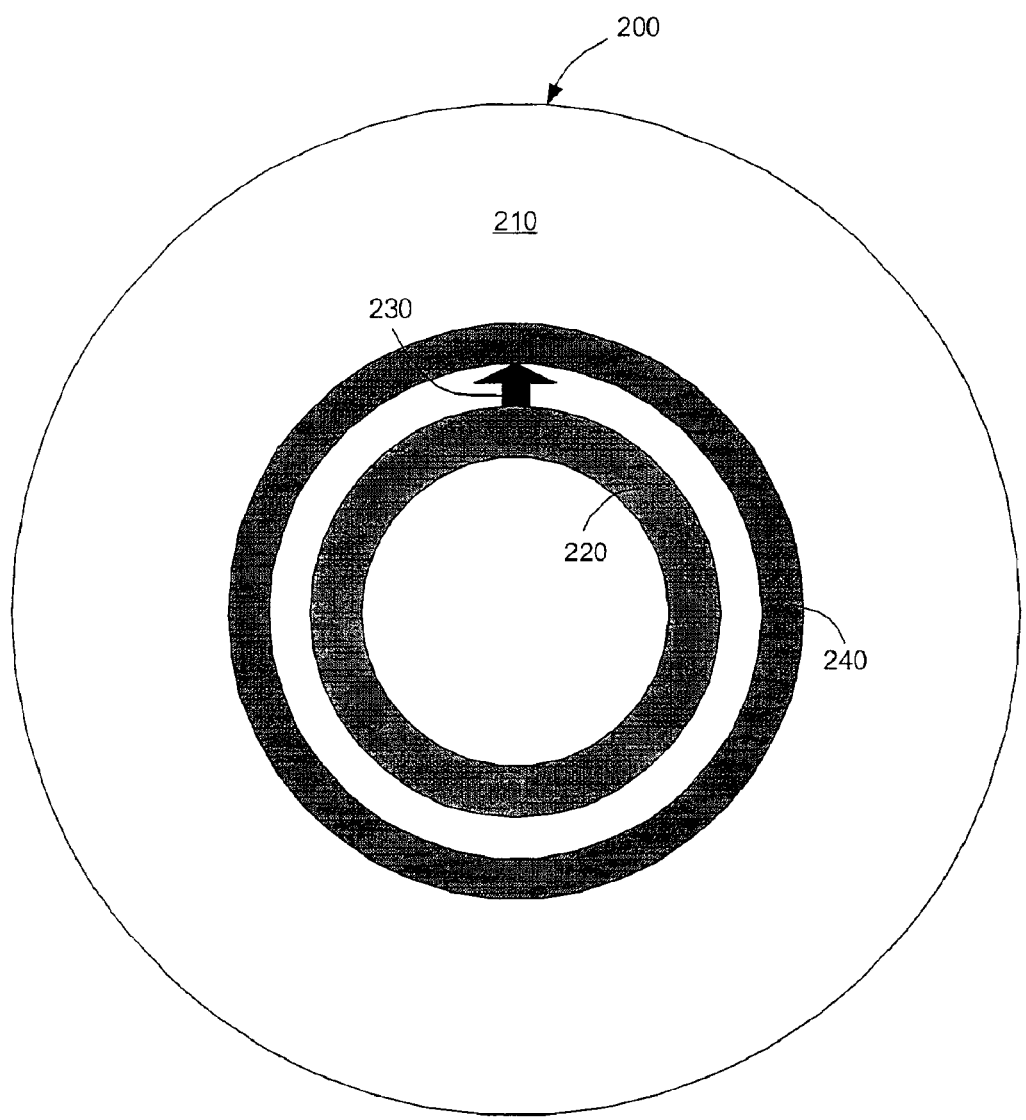
FIG. 2 is a partial view of a storage device that has reference markings or features according to the present invention.

FIG. 2 shows another embodiment of the present invention. A disc 200 includes a data region 210, a clamp or spacer region 220, an index mark 230 and a laser texture zone 240. As shown, index mark 230 has the appearance of an arrow head that is pointed to, and preferably contacting, laser texture zone 240. Preferred dimensions of marking 230 are 0.030" radial dimension by 0.030" tangential dimension. Again, any shaped index mark can be used, and more that one. This embodiment can be modified so that the index mark or marks can be disposed at any radial distance.

Figure 3:
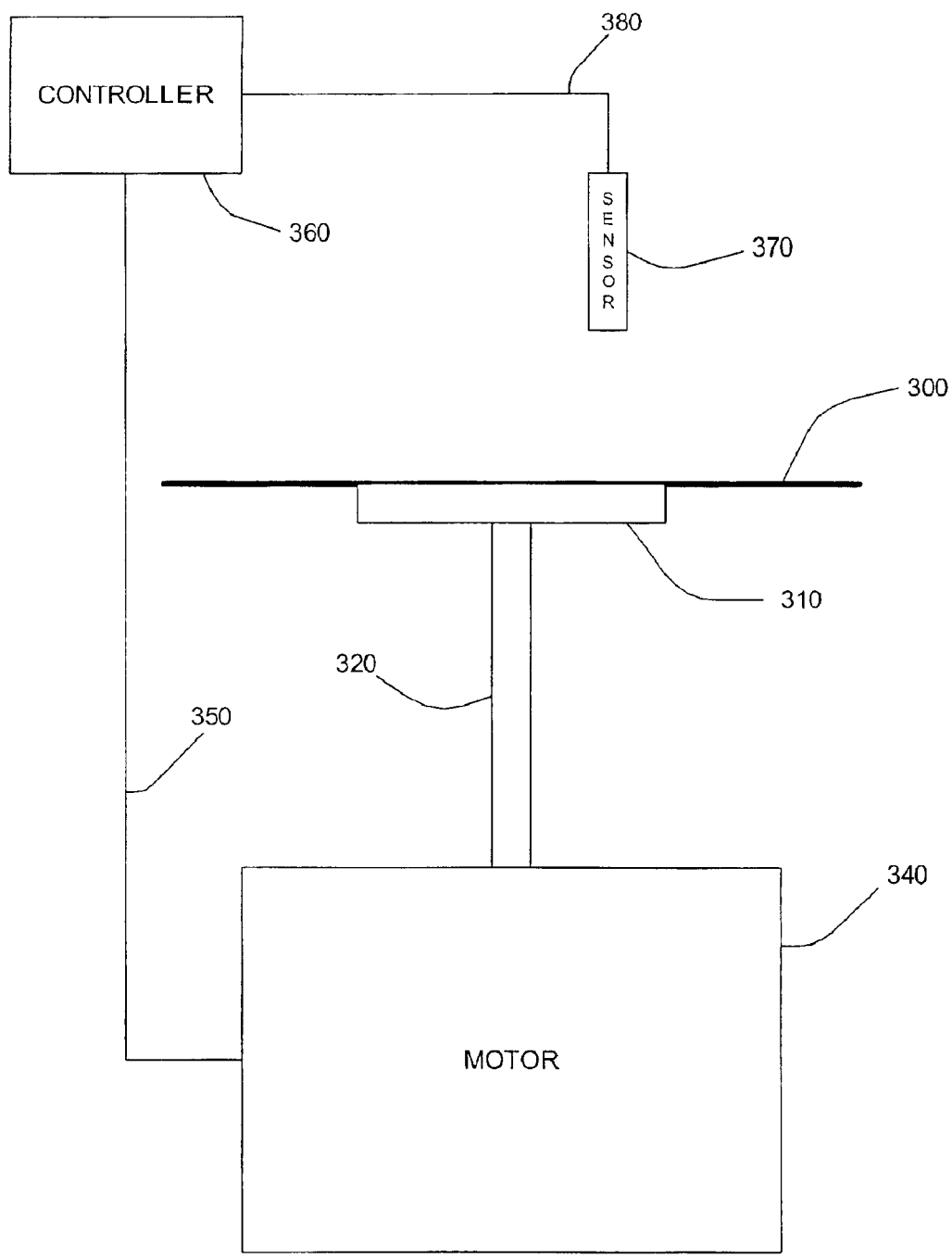
FIG. 3 is a schematic drawing of an apparatus that uses the reference markings or features of the present invention.

FIG. 3 shows a configuration that is used to read the index marks on a disc. A disc 300 is placed on a plate 310, which can be a rotating vacuum chuck. Plate 310 is driven by a motor 340 through axle 320. Motor 340 can be a servomotor, and is controlled by controller 360 through electrical connector 350. Controller 360 can include a microprocessor, microcontroller, or digital signal processor under software control, or dedicated hardware. Controller 360 is also coupled to a sensor 370 through electrical connector 380. Sensor 370 preferably includes a wave sensor, such as a photoelectric diode or array of such diodes. In either case, sensor 370 can also be controllingly positionable, preferably by controller 360. The wave supply (not shown), such as an LED, laser or other light source, or other source that can be reflected and detected, is provided separately from sensor 370. Of course both the wave supply and wave sensor can be provided in sensor 370.

In addition, the wave source can project a wide beam onto a disc, or can be split to provide several beam spots on the disc. Multiple wave sensors can then be used to detect reflections from different portions of the disc. To illustrate, a wide or split beam can be used to illuminate at least two index marks of a pattern. Detection of each mark can be at least almost simultaneous to each other. Furthermore, such a configuration can provide a redundant detection.

Alternatively, the wave sensor can be an optical or digital camera. In this case, the camera acquires an image of an area of the disc (or the whole disc). Then image processing software uses standard routines to detect the index marks (edge-finding, blob finding, etc.). The disc does not have to rotate during the index mark location routine if a camera is used.

In operation, disc 300 is supported on plate 310 and sensor 370 is position to receive a reflection from disc 300 at the radius of the index marks. Disc 300 is rotated by motor 340 while sensor 370 is monitored by controller 360. Controller 360 records a motor encoder position corresponding to each index mark that is sensed by sensor 370. Preferably, the encoder position corresponding to the next index mark is subtracted from the encoder position corresponding to the previous index mark. The difference is then compared to the expected spacing between the index marks. In the case where disc 300 has a pattern like that shown in FIG. 1, when the three index marks are detected, motor 340 stops rotating disc 300. The motor encoder position corresponding to the center index mark is identified as the reference, or 0°, position. Once that reference position is established, disc 300 can be precisely and accurately rotated to another position, if desired. Using three marks instead of less marks prevents false detection of other non-index marks that may be on disc 300.

The configuration in FIG. 3 can be incorporated into a disc stacking machine. The disc stacking machine stacks the aligned discs for a servo track writer. The configuration can also be used to align discs that already have servo information written and are to be put into a disc drive assembly.

Although the present invention is described with one and three index marks, other numbers may be used. The index marks can be placed anywhere on the disc, including the outer diameter and the edge (as opposed to the top and bottom surfaces of the disc). Index marks can be made besides laser etching, such as chemical etching, abrasion and ink. The index marks can be raised above or lowered below the surface of the disc, or at the same level of the disc surface.

Different appearances of the index marks can be used as identifiers. For example, the arrow head index mark 230 shown in FIG. 2 can be used to identify one side of disc 200 while another index mark having a distinguishable appearance from index mark 230 can be used to identify the other side of disc 200. In addition, several patterns can be used as identifiers. The patterns can have components with the same shape, and the same or different dimensions; at least two components with different shapes; a different number of components; and different spacing between components.

Figure 6A:
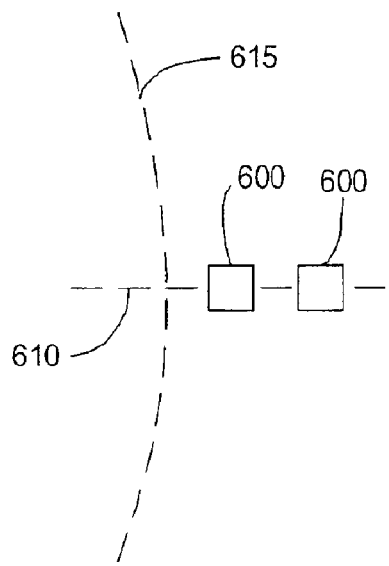
FIGS. 6A–D illustrate further index pattern embodiments of the present invention.
Figure 6B:
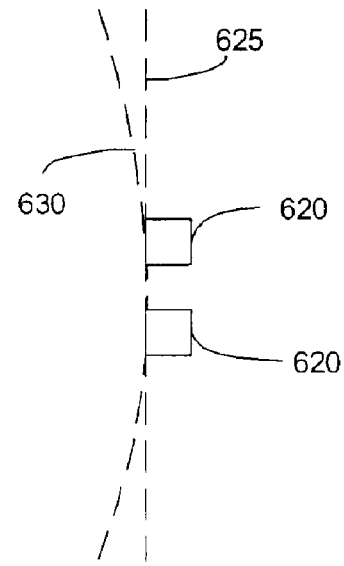
Figure 6C:
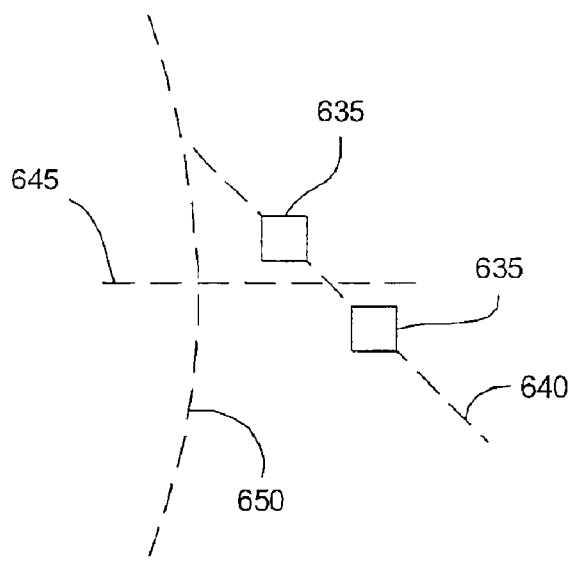
Figure 6D:
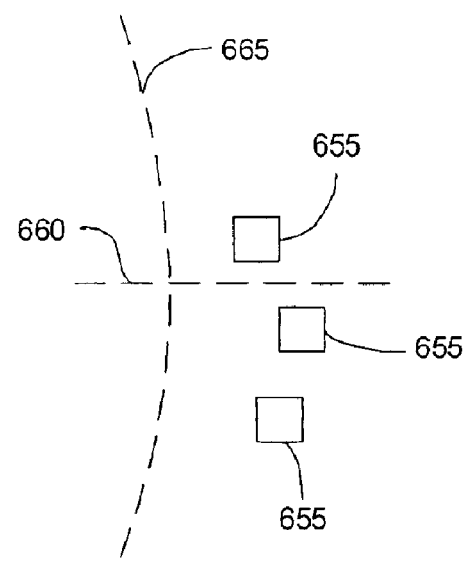

Furthermore, the orientation of the pattern may be radial, tangential, circumferential or angled therebetween. Referring to FIG. 6A, an index pattern that includes index marks 600 is shown radially disposed—aligned, though not necessary—along a radius 610 and relative to a disc portion 615. FIG. 6B shows an index pattern that includes index marks 620 tangentially disposed—aligned, but not necessary—along a tangent 625 and relative to a disc portion 630. FIG. 6C shows an index pattern that includes index marks 635 that is along a line 640 that is angled relative to a radius 645, and relative to a disc portion 650. This embodiment is aligned along line 640. However, the index patterns shown in FIGS. 6A–C do not have to be aligned. FIG. 6D exemplifies such a non-aligned index pattern. An index pattern that includes index marks 655 is disposed relative to both radius 660 and an arc portion 665. Also, as explained previously, each of the index patterns shown in FIGS. 6A–D can have different shaped components, different dimensions, etc.

Figure 7:
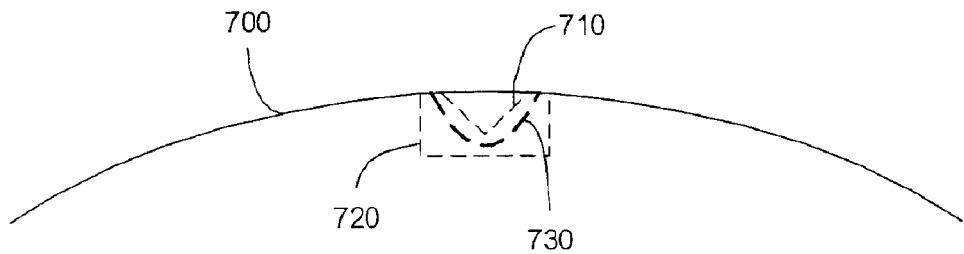
FIG. 7 shows another index mark embodiment of the present invention.
Figure 8:
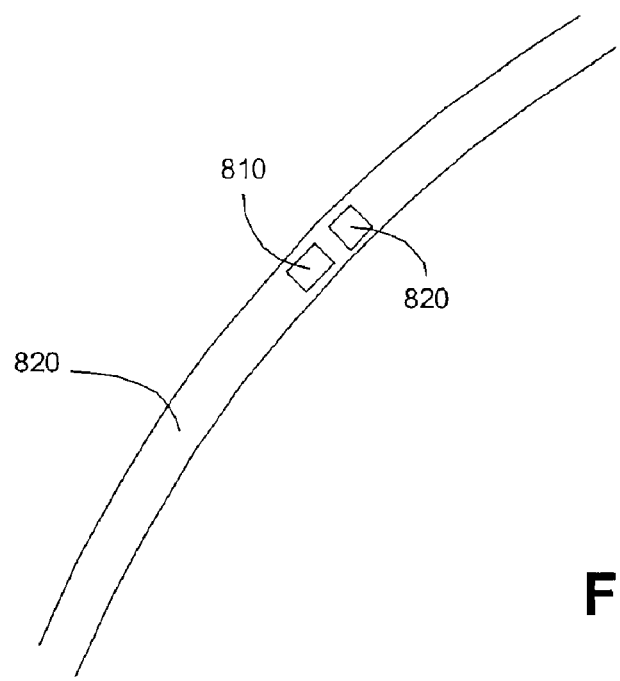
FIG. 8 shows a further index mark embodiment of the present invention.

Turning to FIG. 7, the index mark can also be a notch or other physical shape defined by the disc. An arc portion 700 can be defined by a disc, such as the outer diameter. A triangular notch 710, square notch 720 or a rounded notch 730 can be used as an index mark. Furthermore, more than one notch can be used to create an index pattern. A mechanical configuration can be used to detect the defined physical shape. For example, a biased pin or arm may contact the periphery of the disc while be rotated. When the defined physical shape is encountered, the mechanical configuration would change position to signify the detection of the defined physical shape. And a further embodiment of the present invention is shown in FIG. 8. In that figure, an index pattern includes index marks 800 and 810. The index pattern is disposed on an edge 820 that is defined by a disc.

The present invention is not limited to magnetic storage discs, which include magneto-optical discs. Instead, the present invention also encompasses optical devices, such as CD-ROM, CD-R, CDRW, DVD-ROM, DVD-RW, WORM, etc.

Figure 5:
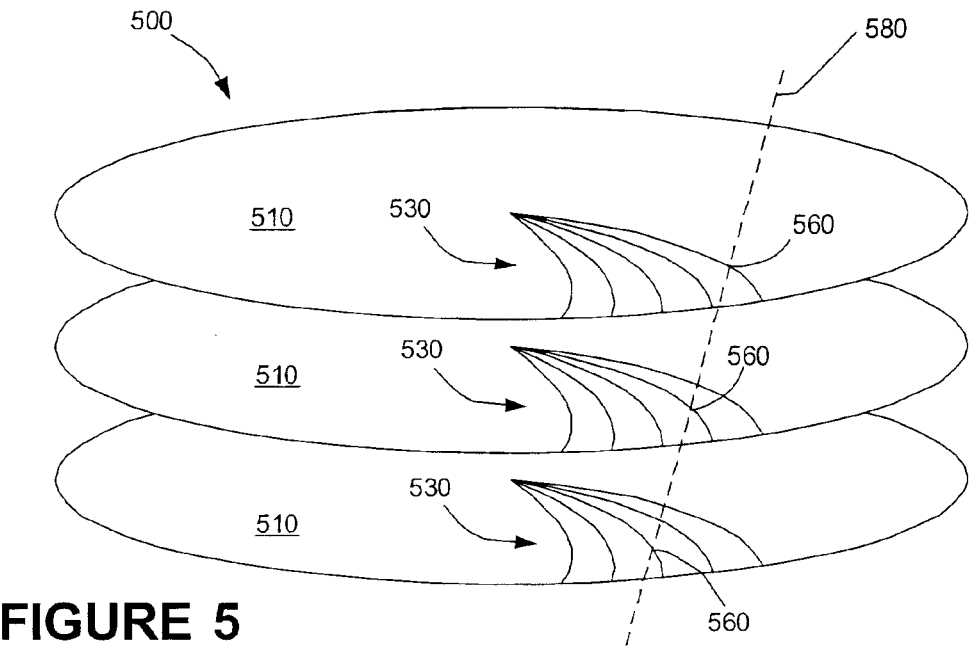
FIG. 5 shows an array of discs having associated offset servo sectors.

A further embodiment of the present invention is shown in FIG. 5. A stacked array 500 includes discs 510. Each of discs 510 includes servo wedges 530 that have respective servo sectors 560. As shown by dashed line 580, servo sectors 560 are offset from each other. In other words, each servo sector 560 is disposed at a different angular displacement relative to the axis of the stacked array 500. Hence line 580, which connects servo sectors 560, is angled relative to each disc 510. The offset placement of servo sectors 560 according to this embodiment will provide compensation for the time required for transitioning from one head to another and then determining which servo sector is under the new head. To provide for this offset, the disc 300 in FIG. 3 would be rotated to provide the desired offset.

The present invention can be used to align the discs for servo writing and then used to align the written discs for inclusion in a disc drive. But the present invention is not limited to servo track writing. The present invention can be used for physical properties of a disc, including but not limited to disc eccentricity, specific disc surface, disc type, information written on the disc, and regions, zones or areas of the disc. Moreover, the present invention can use the index marks for identification only, alignment only or a combination of both. Thus, one aspect of the present invention is that an index mark is associated to a physical property of a disc.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and that are encompassed in the appended claims.

What is claimed is:

1. A method for stacking two discs into a stacked disc array comprising:
   obtaining each disc comprising an index mark adaptively indicating a rotational position of the respective disc;
   orienting each disc in relation to the respective index mark in a disc stacking machine;
   writing servo information to each of the discs;
   removing the discs from the disc stacking machine; and
   reorienting each disc in relation to the respective index mark to define a preselected offset in the servo information between the discs while stacking the discs to form the stacked disc array.

2. The method of claim 1 wherein the reorienting step is characterized by a zero offset.

3. The method of claim 1 wherein the orienting step comprises rotating the discs until at least one index mark is detected.

4. The method of claim 1 wherein the reorienting step is characterized by a nonzero offset.

5. The method of claim 1 wherein the obtaining step is characterized by more than two discs.

6. The method of claim 1 wherein the obtaining step is characterized by an index pattern comprising a first mark and a second mark.

7. The method of claim 6 wherein the obtaining step is characterized by first and second marks that are radially disposed.

8. The method of claim 6 wherein the obtaining step is characterized by first and second marks that are tangentially disposed.

9. The method of claim 6 wherein the obtaining step is characterized by the index pattern comprising a third mark.

10. The method of claim 1 wherein the obtaining step is characterized by the index mark of at least one of the discs being made by laser etching.

11. The method of claim 6 wherein the obtaining step is characterized by the first mark and the second mark comprising different sizes.

12. The method of claim 9 wherein the obtaining step is characterized by the first mark and at least one of the second mark and the third mark comprising different sizes.

13. The method of claim 1 wherein the removing step is characterized by operably eliminating the disposition of the discs relative to each other defined in the orienting step.

* * * * *